United States Patent

Furuta

[15] 3,682,060

[45] Aug. 8, 1972

[54] BATTERY CELL STORAGE DEVICE FOR MINIATURE CAMERAS

[72] Inventor: Koichi Furuta, Tokyo, Japan

[73] Assignee: Nippon Kogaku K.K., Tokyo, Japan

[22] Filed: June 14, 1971

[21] Appl. No.: 152,530

[30] Foreign Application Priority Data

June 16, 1970 Japan ......................45/59074

[52] U.S. Cl. ......................95/11 R, 95/31 EL, 95/42

[51] Int. Cl. .............................................G03b 19/02

[58] Field of Search ...............95/11 R, 31 EL, 42, 13

[56] References Cited

UNITED STATES PATENTS

| | | | |
|---|---|---|---|
| 3,511,146 | 5/1970 | Finelli et al. | ...............95/11 R |
| 2,539,499 | 1/1951 | Walters et al. | ........95/31 EL X |
| 3,486,945 | 12/1969 | O'Donnell | .........95/31 EL UX |

*Primary Examiner*—John M. Horan
*Assistant Examiner*—Kenneth C. Hutchison
*Attorney*—Raymond J. McElhannon et al.

[57] ABSTRACT

A battery cell is stored in the lower section of a reflex camera in a mirror housing. The cell is mounted in or dismounted from a storage chamber having a cover fixed to the mirror housing. The cover is arranged to be opened or closed, and an interlocking member is disposed between an electrical contact for the battery and the cover for retracting the contact in response to the opening of the cover.

3 Claims, 7 Drawing Figures

BATTERY CELL STORAGE DEVICE FOR MINIATURE CAMERAS

BACKGROUND OF THE INVENTION

The present invention relates to single lens reflex cameras, and more particularly to apparatus for storing a battery cell in the cameras.

Various types of battery cells are used in miniature cameras as the power source for electronic shutters and other electrical devices incorporated in the cameras. In general, a large-sized battery cell is used as the power source for both the electronic shutter and the exposure meter so that the requirement for providing a space for housing or storing the battery cell within the camera body is contradictory to the requirement for designing the camera to be compact in size. The space for storing the battery cell is dependent upon the overall construction of the camera and the battery cell is sometimes stored in such a position that is is inconvenient to mount or dismount from the camera.

Thus, a primary aspect of the present invention resides in the provision of a closeable space for storing a battery cell in the lower section in a mirror housing which has a relatively greater space available so that the camera may be designed compact in size and the battery cell may be mounted or dismounted in a simple manner. Another important feature of the invention resides in apparatus for securely mounting the cell between a pair of electrical terminals when it is enclosed in the space provided, thus to assure good electrical contact, and for releasing it automatically from the terminals when the space is unclosed, thus facilitating its removal.

There have thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

A specific embodiment of the invention has been chosen for purposes of illustration and description, and is shown in the accompanying drawings, forming a part of the specification, wherein.

Figure 1:
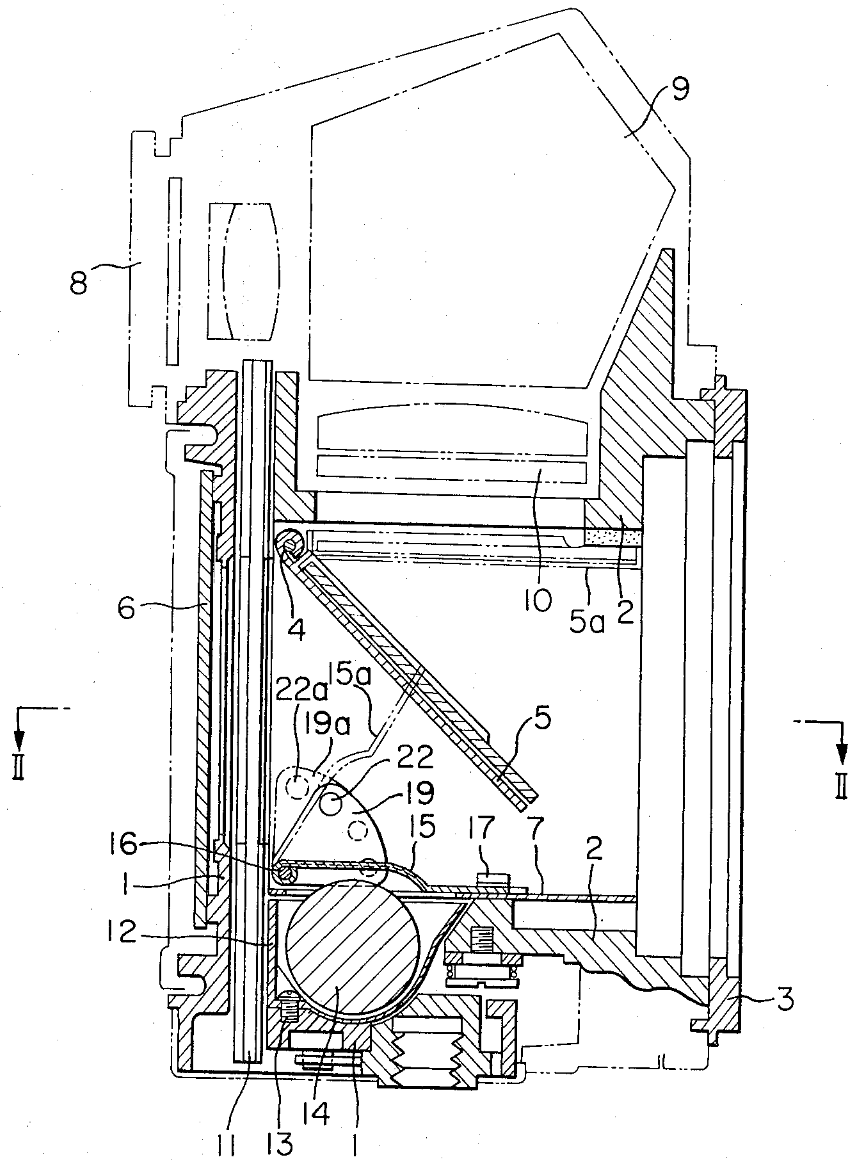
FIG. 1 is a profile sectional view of a camera illustrating one embodiment of the present invention.
Figure 7:
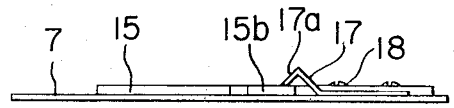
FIG. 7 is a detail view of a locking member for locking the cover of the battery storage chamber in closed position.

Referring first to FIG. 1, it will be seen that the lower portion of a mirror housing 2 of the reflex-type camera upon which is detachably mounted a lens barrel, is formed with a recess extending in the longitudinal direction of the camera for storing therein a battery. A cover 15 of the recess or battery storage chamber which is rotatably carried by a shaft 16 fixed to the mirror housing 2, is also slidable in the axial direction of the shaft 16, and a hook member 17 (FIGS. 1, 2 and 7), fixed to the mirror housing 2, serves to maintain the cover 15 in closed position. A biasing spring 21 is conveniently arranged to urge the cover 15 to open position and also to move same toward the hook member 17 for engagement therewith along the axis of the shift 16. Terminals 28 and 34 are mounted in the battery storage chamber and are electrically connected to an electronic shutter, or the like, of the camera. A spring 30 urges the terminal 28 inwardly so that the battery cell may frictionally be held in position between the terminals. An interlocking member consisting of component parts 19, 22 through 27 (FIGS. 1–5) is provided between the cover 15 and the terminal 28 so as to retract the terminal 28 against the biasing force of the spring 30 in response to the opening of the cover 15.

The present invention will be described in more detail hereinafter. In the accompanying drawings, 1 denotes a reflex camera body having a mirror housing 2; a lens mount 3 on the side of the camera body; a mirror shaft 4; a reflecting mirror assembly 5; a film pressure plate 6; a decorative plate or partition wall 7; an eyepiece of a view finder 8; a prism 9; a ground plate 10; and a shutter 11. The arrangement of the component parts 1–11 is similar to that of a conventional camera of the class described and is shown here to facilitate an understanding of the structure and function of the present invention. As shown in FIG. 1, the reflecting mirror 5 may be retracted from the light path to a film plane and may be also moved to the position shown in broken lines at 5*a* when the battery cell 14 is being replaced.

Figure 2:
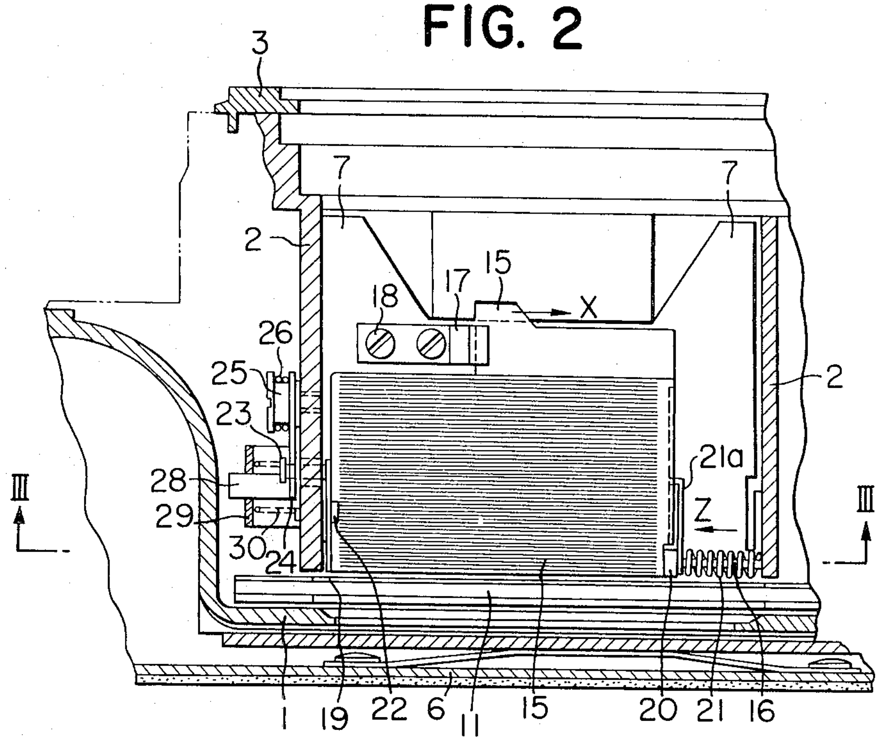
FIG. 2 is a sectional view taken along the line II—II of FIG. 1 and illustrating the cover of the battery cell storage chamber within battery cell storage chamber within the mirror housing.
Figure 3:
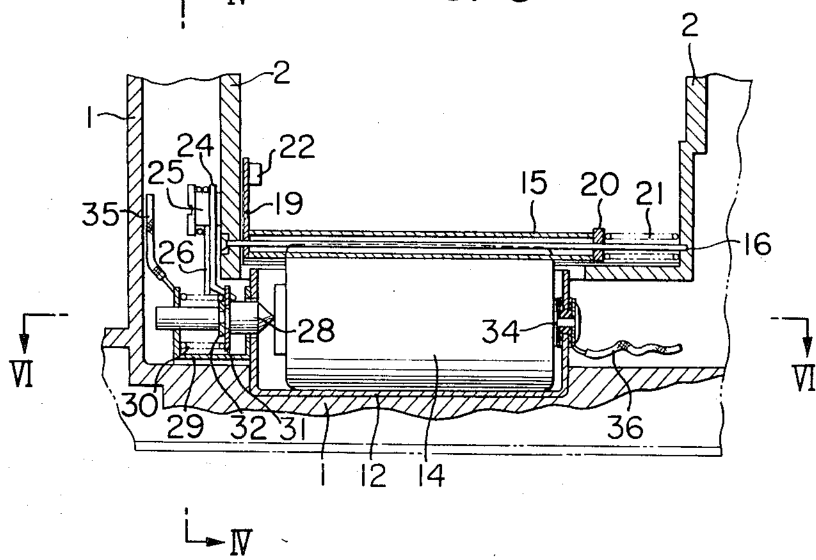
FIG. 3 is s sectional view taken along the lines III—III of FIG. 2 and illustrating the battery cell storage chamber as viewed from the rear side of the camera body.

The battery cell recess or storage chamber 12 is fixed to the camera body 11 by screws 13 and serves to receive and store the battery cell 14. The cover 15 of the storage chamber 12 is rotatably fixed to the mirror housing 2 by the hinge pin or shaft 16 and is also slidable along the axis of the shaft 16. As shown in FIG. 2, the upper surface of the cover 15 is provided with means, such as a plurality of grooves, which serve to prevent light reflection from that surface. The cover 15 may be retained in closed position by a latch or hook member 17 fixed to the mirror housing 2 by screws 18 and having a free end inclined, as indicated at 17*a* in FIG. 7.

Referring still to FIG. 2, a sector-shaped member 19 is shown rotatably mounted on one end of the shaft 16 and a spring 21 is disposed at its other end so as to bias the cover 15 through a washer 20 to normally make contact with the sector-shaped member 19. One end 21*a* of the spring 21 is fixed to the side edge of the cover 15 so as to lift the cover 15 to the position indicated by broken lines at 15*a* (FIG. 1) when the engaging portion 15*b* of the co r 15 is disengaged from the hook member 17.

Figure 4:
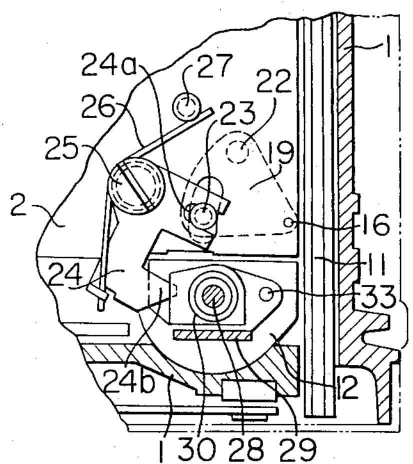
FIG. 4 is a sectional view taken along the lines IV—IV of FIG. 3 and illustrating a movable terminal actuating member as viewed from one side of the mirror housing.
Figure 5:
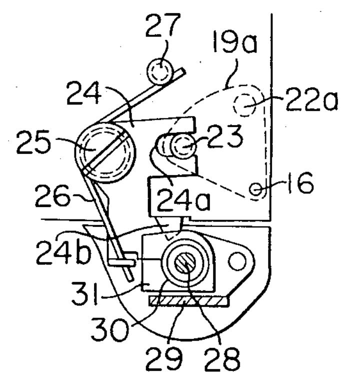
FIG. 5 is a view similar to FIG. 4 and illustrating the position of various parts upon displacement of the actuating lever.

Referring now to FIG. 4, a pin 22 extending from the sector-shaped member 19 contacts the cover 15 when the latter is being lifted, thereby displacing the sector-shaped member 19 toward the position indicated in broken lines at 19*a* in FIG. 1. A second pin 23 extending from the sector-shaped member 19 through the wall of the mirror housing 2 engages with the bifurcated portion 24*a* of an actuating lever 24 which is rotatably fixed to the mirror housing 2 by a shaft 25 and is biased to rotate in one direction under the force of a spring 26. One end of the spring 26 is held in position by a stop 27, and the other end bears against a suitable tab formed on the lever 24.

The sector-shaped member 19, pins 22 and 23, actuating lever 24, its shaft 25, spring 26 and spring stop 27 constitute the interlocking device for retracting the movable terminal 28 against the force of the spring 30 away from the battery cell 14 in response to the opening action of the cover 15 and to permit the spring 30 to urge the movable terminal 28 against the battery cell in response to the closing action of the cover 15.

The movable terminal 28 is slidably fitted through a retaining member 29 fixed to the storage chamber 12 by rivets 33, and is normally urged toward the terminal of the battery cell 14 through an actuating plate 31 under the force of the spring 30. The actuating plate or disk 31 is held in position by means of a retaining member 32 and contacts a sloping surface 24*b* of the actuating lever 24. Upon rotation of the actuating lever 24, the actuating plate or disk 31 is displaced outwardly by the surface 24*b*, thus compressing the spring 30. As a consequence, the terminal 28 is moved away from the terminal of the battery cell 14. As will be appreciated by those persons skilled in the art, the battery cell may be connected to an electronic shutter, an exposure meter or the like by leads 35 and 36.

Figure 6:
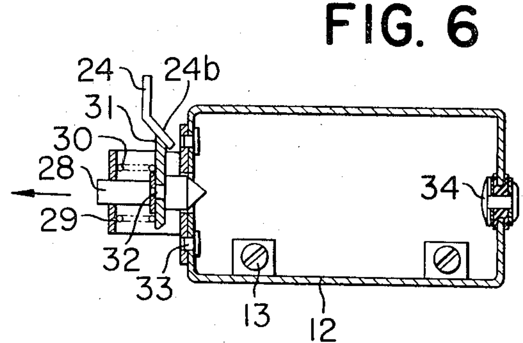
FIG. 6 is a sectional view taken along the lines VI-VI of FIG. 3 and illustrating the battery cell storage chamber and its terminals.

Next, the mode of operation will be described. After the reflecting mirror 5 has been moved to the position shown at 5*a*, the operator may push the engaging portion 15*b* of the cover 15 in the direction indicated by the arrow X in FIG. 2, by inserting the finer through the lens mount 3, so as to disengage the engaging portion 15*b* of the cover 15 from the hook member 17. As a consequence, the cover 15 is opened to the position 15*a* in FIG. 1 by the force of the spring 21; and the pin 22 rotates about the shift 16 to the position 22*a* due to its contact with the cover 15. The sector-shaped member 19, in which the pin 22 is mounted, is therefore rotated so that the actuating lever 24 is caused to rotate by the pin 29, also mounted in the sector-shaped member 19, from the position indicated in FIG. 4 to the position indicated in FIG. 5. The actuating plate or disk 31 is pushed in the direction indicated by the arrow Y in FIG. 6 by the sloping surface 24*b* of the actuating lever 24 so that the movable terminal 28 is moved away from the terminal of the battery cell 14. As a consequence, the battery cell, which has been held between the movable and stationary terminals 28 and 34, is now freed. Thereafter, the camera is turned upside down so that the battery cell 14 is ejected out of the storage chamber 12 along the inner surface of the cover 15. From the description thus far, it will be seen that the battery cell 14 may be removed from the storage chamber 12 by only one-finger-operation.

To close the cover 15, engaging portion 15*b* of the cover 15 is pushed down by the finger so that the cover 15 slides along the sloping surface 17*a* of the hook member 17 (see FIG. 7) and is forced into engagement with the hook member 17 under the force of the spring 21, which acts in the direction indicated by the arrow *z* in FIG. 2. In this case, the actuating lever 24 is returned from the position in FIG. 5 to the position in FIG. 4 under the force of the spring 26 so that the movable terminal 28 is forced by the spring 30 into contact with the terminal of the battery cell 14. The force of the spring 21 must, of course, be sufficient to overcome the force of springs 30 and 26.

From the foregoing description, it will be noted that the battery cell, which is used as a power source for an electronic shutter and the like incorporated in the camera, may be housed in the lower space of the mirror housing and may be removed in a simple manner. The cover of the battery storage chamber serves as the conventional shielding plate in photography. It will also be appreciated that the cover may be immediately opened by pushing it laterally with the finger, and the movable terminal is simultaneously retracted away from the battery cell so that when the camera is turned upside down the battery cell is naturally moved away from the storage chamber along the inner surface of the cover. Thus, the battery cell may be removed out of the camera body in a very simple manner. Additionally, after pushing the cover downward, as viewed in FIG. 1, it may be held in closed position while the movable terminal is automatically moved toward the battery for contact with the terminal thereof, thereby securely holding the battery cell in position in the storage chamber.

I claim:

1. A battery cell storage device for reflex cameras of the type detachably mounting a lens barrel characterized in that a recess extending along the longitudinal axis of the camera is provided in the lower section of a mirror housing (2) so as to define a battery cell storage chamber; a cover (15) for said storage chamber is fixed to said mirror housing by a shaft (16) for pivotal movement between open and closed positions and for slidable movement along the axis of said shaft (16); a locking member (17) for locking said cover (15) in closed position is fixed to said mirror housing (2); and a spring (21) is provided for biasing said cover (15) to open position and toward said locking member (17) for engagement therewith in the axial direction of said shaft (16).

2. Apparatus according to claim 1, further characterized in that terminals (28, 34) electrically connected to electrically operable devices in the camera are mounted in said battery cell storage chamber, spring means (30) provided to urge one of said terminals toward said battery cell firmly to maintain same in position between said terminals in contact therewith, and interlocking means are operably associated with said one of said terminals and said cover to retract said terminal against the force of said spring means (30) in response to opening movement of said cover.

3. Apparatus according to claim 2, further characterized in that said interlocking means include a member (19) mounted adjacent said cover (15) for pivotal movement by said cover when said cover opens, a lever (24) also mounted for pivotal movement by said member (19) when said cover opens, and a surface (**24*b*) on said lever (24) adapted to retract said one of said terminals from said battery cell upon such pivotal movement of said lever (24), and means (26) urging said lever (24**) to its initial position.

* * * * *